United States Patent [19]

Marjoram

[11] Patent Number: 4,470,477
[45] Date of Patent: Sep. 11, 1984

[54] HYDROPNEUMATIC SUSPENSIONS

[75] Inventor: Robert H. Marjoram, Coventry, England

[73] Assignee: Dunlop Limited, London, England

[21] Appl. No.: 434,063

[22] Filed: Oct. 13, 1982

[30] Foreign Application Priority Data

Oct. 23, 1981 [GB] United Kingdom ................. 8132011

[51] Int. Cl.³ ........................................... B62D 27/06
[52] U.S. Cl. ................................ 180/89.14; 296/35.1
[58] Field of Search ............... 180/89.13, 89.14, 89.15, 180/89.16; 296/35.1, 190

[56] References Cited

U.S. PATENT DOCUMENTS 3,797,883  3/1974  Steiner et al. ..................... 180/89.14
3,972,557  8/1976  Hudston et al. .................... 296/35.1
4,372,411  2/1983  Flower ............................. 180/89.16

FOREIGN PATENT DOCUMENTS 158169  9/1982  Japan .................................... 296/190

Primary Examiner—Joseph F. Peters, Jr.
Assistant Examiner—Kenneth R. Rice
Attorney, Agent, or Firm—Stevens, Davis, Miller & Mosher

[57] ABSTRACT

The invention provides a hydropneumatic suspension system which is particularly suitable for lorry cabs of the kind which require to be tilted about a horizontal axis for access to the engine. Such a system normally has the disadvantage that a hydropneumatic unit, incorporating a diaphragm does not provide a firm pivot anchorage for the cab tilting system.

The invention overcomes this problem by pivotally attaching one portion of the displacer unit, below the diaphragm, to a downwardly extending formation of the cab and arranging for abutment between the formation and the displacer unit portion above the tilt axis to maintain the displacer unit portions in alignment when the cab is in the ride position.

6 Claims, 4 Drawing Figures

HYDROPNEUMATIC SUSPENSIONS

This invention relates to improvements in hydropneumatic suspensions and more particularly to the application of a hydropneumatic suspension to the driver's cab of a truck, the cab being of the kind which is intended to be tiltable about a forward horizontal axis to gain access to the engine.

Hydropneumatic suspension systems have been in use on vehicles for many years. Essentially a hydropneumatic suspension system is one in which the body of a vehicle is supported relative to the wheels by means of a distribution of displacer units each of which comprises a stem telescopically movable into and out of the housing, one being connected to the body and the other to a wheel. The connection between the stem and housing of each displacer is a liquid-impervious diaphragm, usually a rolling lobe diaphragm, of a material such as textile-reinforced rubber, this diaphragm co-operating with another, spaced from it, of a material such as butyl rubber, to define between the diaphragms a chamber for liquid. The second diaphragm may be in a separate unit, communicating with the housing of the displacer unit via a pipe, and on the other side of the second diaphragm is a gas spring chamber which imparts resilience to the assembly, relative vertical movements of the parts of the vehicle connected by the displacer being absorbed by the gas spring. It is usual for the liquid chamber to be sub-divided so that liquid movement in the space between the diaphragms is restricted to provide a damping effect. It is also usual for the volume of liquid in the system to be variable in response, for example, to a varying load on the suspended part of the vehicle. This can be achieved by a levelling valve which either connects the liquid chamber with a source of liquid under pressure or discharges liquid to a reservoir in response to variations in the height of the vehicle body above the wheel axles. Alternatively, levelling may be achieved by varying the pressure in the gas spring chamber.

In recent years there has been increasing emphasis on the desirability of improving driver comfort in heavy trucks of the kind in which the driver's cab represents a relatively small proportion of the total length of the vehicle, the cargo carrying part of the vehicle requiring a suspension system which is too hard for optimum driver comfort. One problem associated with the application of a hydropneumatic suspension system exclusively for the cab of such a vehicle resides in the fact that due to the relatively short length of the cab it is more susceptible to the effects of relative movement between the stems and housings of the displacer units supporting it, particularly to "pitching" in the event of emergency braking of the vehicle. Another problem is that such cabs are normally designed to tilt about a forward horizontal axis to provide access to the engine beneath the cab, being held during normal travel by releasable latches at the rear of the cab. The permitted angular movement of the stem part relative to the housing part of each forward displacer unit within the limits of the apertures in the displacer housings through which the stems pass is far too small for the purposes of tilting a cab through 50°–70° to a tilted position providing access to the engine, and moreover any such angular movement is undesirable as tending to cause damage and distortion to the components of the displacers, particularly the rolling lobe diaphragms which will be subject to abrasion between the associated stem and housing.

As a cab is tilted, usually by a ram provided for the purpose, about a forward, horizontal pivot the direction of the force applied to the pivot rotates around it, being first primarily forward, then as the cab passes "over centre" being primarily downward and finally being rearward and downward. Lateral forces acting on the pivot thus change from forward to rearward, passing through equilibrium as the centre of gravity of the cab passes vertically over the pivot.

In a conventional hydropneumatic suspension system the body of a vehicle is supported at points coinciding with the centre lines of the displacer units, i.e. the lines along which the stems of the displacers are telescopic relative to the associated housings. Given the need for a pivotal connection between the supported body part and, e.g. the forward pair of an arrangement of four displacer units supporting the cab of a truck in its normal "ride" position, the problem is presented that when tilted (and lifted clear of the rear pair of displacers) the cab effectively has a double pivot connection to the chassis at each forward displacer, limited angular movement of the stem of each forward displacer relative to its housing representing the second pivotal connection. The "double pivot" connection of the cab to the chassis gives scope for erratic and unpredictable movement of the cab relative to the chassis as changes occur in the direction and magnitude of lateral forces acting on each "pivot".

An object of the present invention is to provide a solution to the above problems.

In accordance with the invention there is provided a vehicle having a body part tiltable about a horizontal axis between a "ride" position over the wheel base and an outboard position, said body part being suspended, when in the "ride" position by a hydropneumatic suspension which includes displacer units adjacent said axis each comprising a stem portion and a housing portion interconnected by a diaphragm and relatively reciprocable to absorb the transmission of shock loads from the vehicle to said body part, wherein said horizontal axis is located outboard of displacer units adjacent thereto and below the diaphragms of said adjacent displacer units and wherein said body part has a downwardly extending formation to which one of said displacer unit portions is pivotally attached and which, when said body part is in the ride position, abuts the said portion of each said adjacent displacer unit on the same side as and above said axis, said formation serving to maintain the or each displacer portion abutted thereby in an aligned relation to the other portion when the body part is in the ride position.

The above arrangement provides two principal advantages:

(a) Where the body part, e.g. the tiltable cab of a truck, is releasably locked at its end remote from the tilt axis when in the "ride" position the downward formation or formations adjacent the tilt axis give lateral stability to the adjacent displacer units, especially in the fore-and-aft direction.

(b) Positioning of the pivotal axis below the diaphragms of the displacer units and the initial offset between the pivotal axis and the centre lines of the displacers ensures that if there is any angular movement between the components of each unit as the body part is tilted this will finally be in a direction such as to bring the pivotal axis inboard of the vehicle, where forces to which the pivot is subject can be conveniently reacted e.g. by the chassis of the vehicle, providing a stable tilted position for the cab.

In a preferred construction the forward end of the vehicle body part has downwardly extending legs which, in the normal "ride" position of the body part are alongside and contact the forward displacer units, subjecting them to a predetermined loading in the aft direction. The free end of each leg is received between the arms of a yoke integral with the housing of the associated displacer, a pivot pin passing between the arms of the yoke through a bearing aperture in the leg. In this arrangement the stem of each displacer unit is preferably fixed relative to a chassis of the vehicle to be upstanding therefrom and passes through an aperture in the web portion of the yoke by means of a sleeve integral with the web portion of the yoke which receives and is fixed to the displacer housing. A convenient way of effecting such fixture is to swage the end of the sleeve remote from the yoke over the outstanding circumferential rib of the housing which is located where the housing is in turn swaged over the outer peripheral bead of the rolling lobe diaphragm within the housing.

The free end portions of the legs formed with the bearing apertures are preferably bent rearwardly of the chassis, the arms of the associated yoke being bent forwarly to receive the rearwardly bent portions of the legs.

A preferred embodiment of the present invention will now be described with reference to the accompanying drawings, in which.

Figure 1:
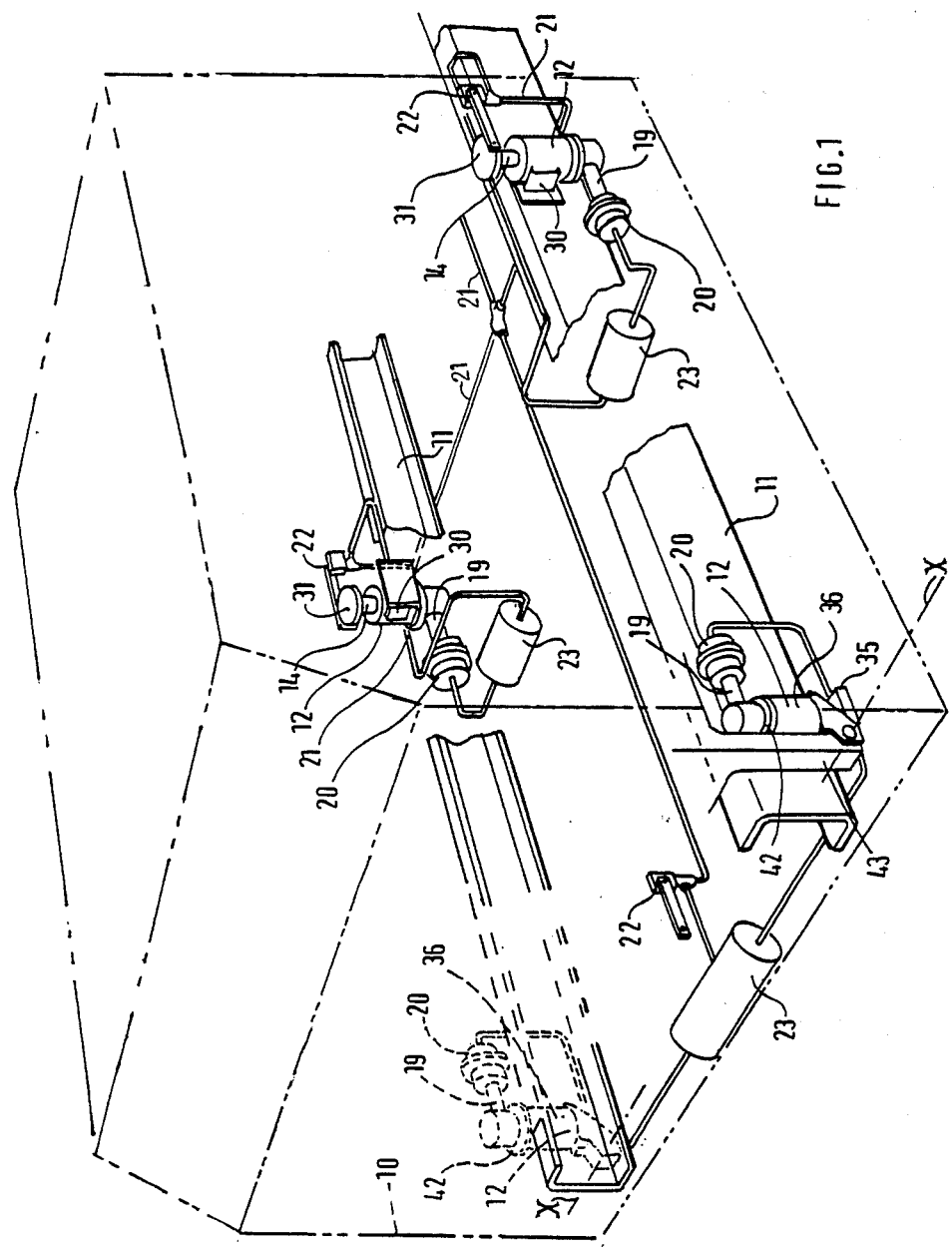
FIG. 1 is a schematic general arrangement view of a tiltable truck cab mounted on the truck chassis by means of four hydropneumatic displacers.
Figure 2:
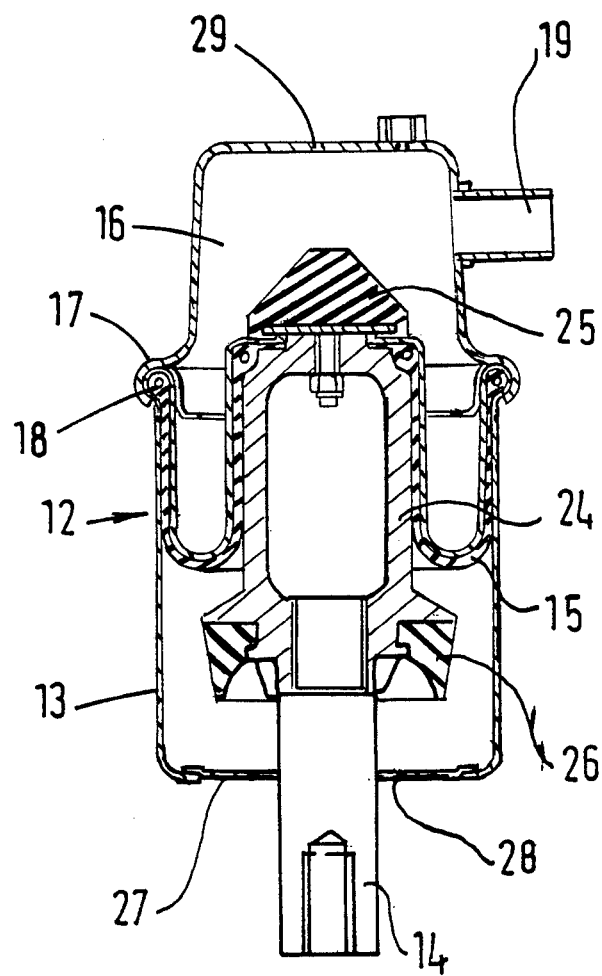
FIG. 2 is a sectional elevation of one of the displacer units.
Figure 4:
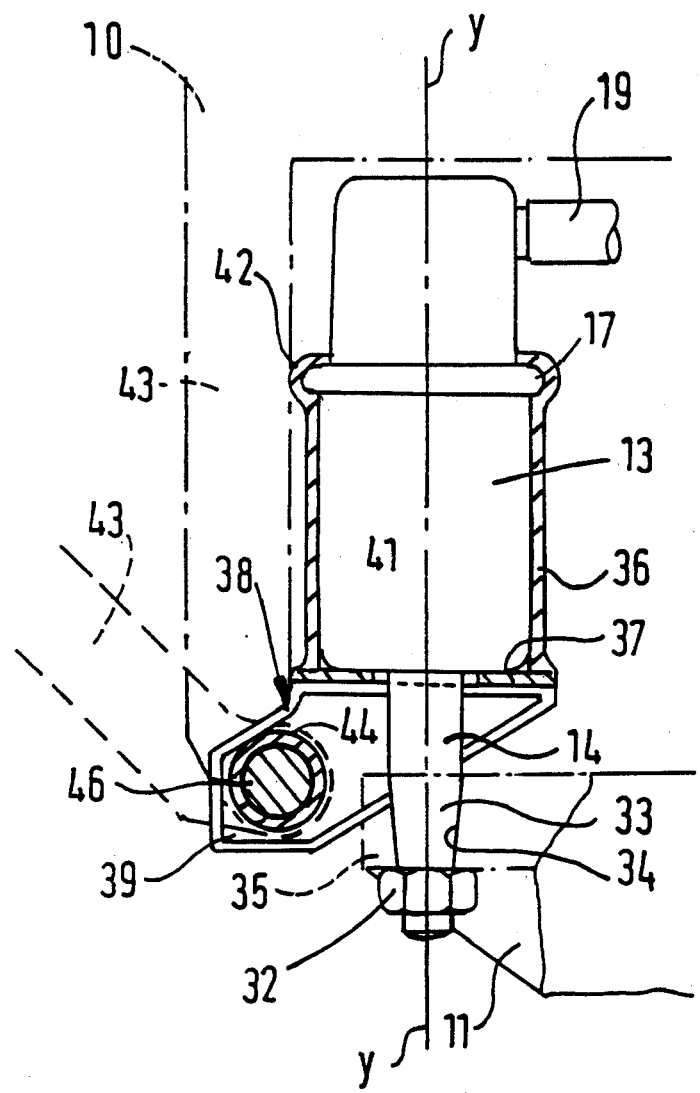

The chassis 11 of a cargo-carrying road vehicle supports a driver's cab 10 (illustrated in phantom lines in FIG. 1) on four hydropneumatic displacer units 12, each being of a kind known per se and illustrated in more detail in FIG. 2. The cab 10 is shown in FIG. 1 in its normal, "ride" position over the chassis 11 in which it is held by releasable latches (not shown) at the rear of the cab. When it is desired to gain access to the engine (not shown) beneath the cab 10 between the members of the chassis 11 the latches are released and the cab 10 is rotated about a horizontal axis x—x at the front of the cab 10 transverse to the chassis 11 by means of a hydraulic ram (not shown) acting between the chassis 11 and the cab 10. The operation of the ram lifts the rear of the cab 10 clear of the rear pair of displacers 12 and moves it forwardly and outwardly of the chassis 11 to adopt a stable, tilted position, tilted between 50° and 70° from the position shown in FIG. 1 and FIG. 4.

Referring to FIG. 2, each displacer unit 12 comprises a housing portion including a housing 13, and a stem portion which consists of a stem 14, the two portions being connected by a rolling lobe diaphragm 15 which defines within the housing 13 a liquid chamber 16 on one side of the diaphragm. As is known per se, the housing 13 has an outstanding circumferential annular rib 17 formed by swaging components of the housing 13 over the outer peripheral bead reinforcement 18 of the rolling lobe diaphragm 15.

The liquid chamber 16 of each displacer unit 12 is in communication via a pipe 19 with an associated coupler unit 20, also known per se, in which there is a second diaphragm providing the interface between liquid in the chamber 16 and gas under pressure on the other side of the coupler diaphragm. As shown in FIG. 1 the supply of air under pressure through pipes 21 to the couplers 20 is controlled by levelling valves 22 which respond in known manner to variations in the height of the cab 10 relative to the chassis 11 to maintain a predetermined air pressure in reservoirs 23 included in the supply lines to the couplers 20. In use of the vehicle forces transmitted between the chassis 11 and cab 10 tending to reciprocate the stem 14 of each displacer unit 12 relative to the associated housing 13 are transmitted by the incompressible liquid in the chamber 16 to the gas spring represented by the couplers 20. As shown in FIG. 2 and the stem 14 of each displacer unit 12 has an enlargement 24 to which the inner periphery of the rolling lobe diaphragm 15 is secured, the enlargement 24 having at its free end within the liquid chamber 16 a rubber buffer 25 and at its other end an annular rubber buffer 26 which, when the stem 14 is fully extended out of the housing 13, will abut an end wall 27 of the housing formed with a central aperture 28 through which the stem 14 extends. Similarly the buffer 25 limits movement of the stem 14 inwardly of the liquid chamber 16 (e.g. under very exceptional shock loads or in the event of failure of the associated gas spring) by abutting the end wall 29 of the housing.

Figure 3:
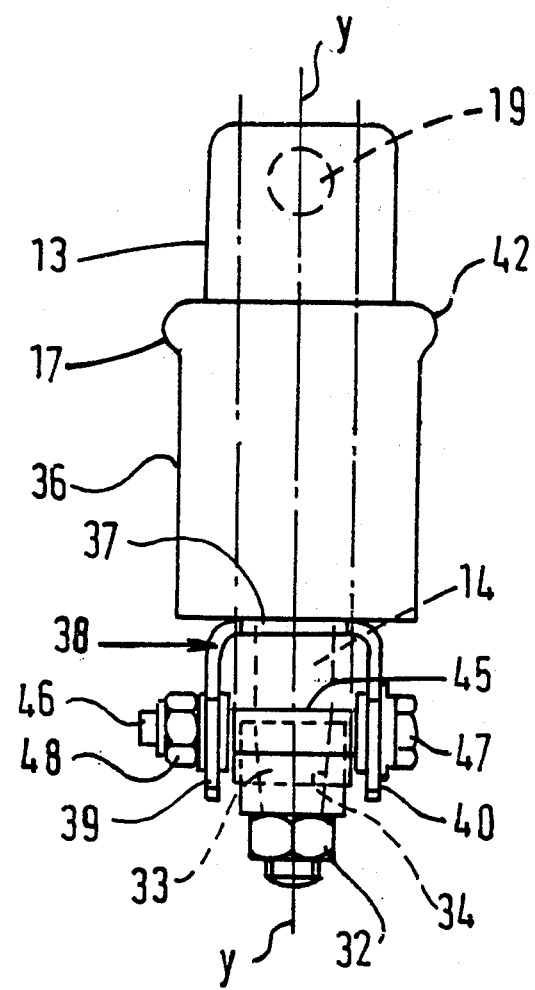
FIGS. 3 and 4 are respectively end and side views of the mounting for one of the forward displacer units illustrated in FIG. 1, FIG. 4 illustrating the pivotal connection of the housing of the displacer unit to the cab and the fixture of the stem of the displacer unit to the chassis.

To provide the required spring suspension it is clearly a matter of convenience whether the housing 13 is secured to the chassis 11 and the stem 14 supports the cab 10 or vice-versa. In the arrangement illustrated in FIG. 1 the housings 13 of the rear pair of displacers 12 are fixed to the chassis members 11 by brackets 30. The free ends of their stems 14 terminate in platforms 31 on which the cab 10 will rest when in its "ride" position and releasably held by the latches. In contrast the stems 14 of the forward pair of displacers are fixed to the chassis members 11 (see FIG. 4) and their housing components 13 are pivotally connected to the cab 10. The free end of the stem 14 of each forward displacer unit 12 is screw-threaded to receive a nut 32 which firmly seats a tapered portion 33 of the stem in a tapered bore 34 in a flange 35 intergral with the associated chassis member 11. The housing 13, on the other hand, is received in a sleeve 36, forming part of the "housing portion", which is integral at its lower end with the web portion 37 of a yoke 38 which has arms 39 and 40 extending forwardly and downwardly with respect to the web 37 on opposite sides of the stem 14. The web 37 of the yoke 38 has a central aperture 41 in register with the aperture 28 in the housing 13 through which the stem 14 extends and the housing 13 is integrated with the yoke 38 by swaging the upper end of the sleeve 36 over the rib 17 of the housing as indicated at 42 in FIGS. 3 and 4.

At its leading end the cab 10 has downwardly extending formations provided by legs 43 the free end portions 44 of which are bent downwardly and rearwardly with respect to the chassis and apertured to receive a bearing sleeve 45 which lies between the arms 39 and 40 of the yoke 38. A bolt 46 passes through bearing sleeve 45 and through apertures in register therewith in the arms 39 and 40 of the yoke, being held in position by a head 47 and nut 48.

By this arrangement each leg 43 of the cab 10 is pivotable relative to the associated yoke 38 about the associated bearing sleeve 45 so that the cab 10 as a whole is pivotable relative to the chassis 11 about the axis x—x. The position of the legs 43 when the cab is tilted forwards is indicated in dotted lines in FIG. 4. When the cab 10 is locked in its "ride" position (FIG. 1), the legs 43 abut the sleeves 36 surrounding the forward displacer housings at the points 42, the geometry of the triangle represented by the centre of the diaphragm 15 of each forward displacer, its abutment point 42 and its pivot pin (bolt 46) being so chosen that the housing 13 of each forward displacer is maintained generally in coaxial relation to the stem 14 despite up-and-down movement of the cab 10 relative to the chassis 11.

When the cab 10 is to be tilted its rear fastenings are released and it is lifted off the platforms 31 of the rear displacers. At this point the resultant of forces acts on the pivot bolts 46 in the forward direction (i.e. to the left as viewed in FIG. 4). As the cab is lifted and its centre of gravity moves nearer (in the horizontal sense) to the pivot axis, the axis x—x is below the diaphragms of the forward displacers and there is only a small lateral offset between the axis x—x and the longitudinal centre line y—y of each forward displacer. This ensures that throughout rotation of the direction of application of force to each pivot bolt 46 the moment which will cause angular (as opposed to lateral) deflection of each housing 13 relative to the associated stem 14 is within acceptable limits.

In the arrangement described above, the housing portion is attached to the cab and the stem portion is attached to the vehicle chassis, but in an alternative arrangement the housing portion may be secured to the chassis and the stem portion to the cab. In the latter arrangement modification of the stem structure may be required to provide the necessary abutment point between the stem portion and the associated downwardly extending leg.

Having now described my invention, what I claim is:

1. A vehicle having a body part tiltable about a horizontal axis between a "ride" position over the wheel base and an outboard position, said body part being suspended, when in the "ride" position by a hydropneumatic suspension which includes displacer units adjacent said axis each comprising a stem portion and a housing portion interconnected by a diaphragm and relatively reciprocable to absorb the transmission of shock loads from the vehicle to said body part, wherein said horizontal axis is located outboard of displacer units adjacent thereto and below the diaphragms of said adjacent displacer units and wherein said body part has a downwardly extending formation to which one of said displacer unit portions is pivotally attached and which, when said body part is in the ride position, abuts the said portion of each said adjacent displacer unit on the same side as and above said axis, said formation serving to maintain the displacer portion abutted thereby in an aligned relation to the other portion when the body part is in the ride position.

2. A vehicle as claimed in claim 1, wherein the forward end of the vehicle body part has downwardly extending formations in the form of legs which, in the normal "ride" position of the body part are alongside and contact the forward displacer units, subjecting them to a predetermined loading in the aft direction.

3. A vehicle as claimed in claim 2, wherein the free end of each leg is received between the arms of a yoke integral with the housing of the associated displacer, a pivot pin being provided and passing between the arms of the yoke through a bearing aperture in the leg.

4. A vehicle as claimed in claim 3, wherein the stem of each displacer unit is fixed relative to a chassis of the vehicle to be upstanding therefrom and passes through an aperture in a web portion of the yoke, the displacer unit being secured to the associated leg by means of a sleeve secured to the web portion of the yoke, the sleeve receiving and being fixed to the displacer housing.

5. A vehicle as claimed in claim 4, wherein the end of the sleeve remote from the yoke is swaged over an outstanding circumferential rib of the housing, said rib being located in a position where the housing is in turn swaged over an outer peripheral bead of a rolling lobe diaphragm within the housing.

6. A vehicle as claimed in claim 3, wherein free end portions of the legs formed with the bearing apertures are bent rearwardly of the chassis, the arms of the associate yoke being bent forwardly to receive the rearwardly bent portions of the legs.

* * * * *